US008660004B2

(12) United States Patent
Baykal et al.

(10) Patent No.: US 8,660,004 B2
(45) Date of Patent: Feb. 25, 2014

(54) SYSTEMS AND METHODS FOR MULTICAST ADMISSION CONTROL

(75) Inventors: Berkay Baykal, Westborough, MA (US); Shaun Missett, Avon, CT (US)

(73) Assignee: Calix, Inc., Petaluma, CA (US)

( * ) Notice: Subject to any disclaimer, the term of this patent is extended or adjusted under 35 U.S.C. 154(b) by 566 days.

(21) Appl. No.: 13/028,659

(22) Filed: Feb. 16, 2011

(65) Prior Publication Data

US 2012/0207019 A1   Aug. 16, 2012

(51) Int. Cl.
*H04L 12/26* (2006.01)

(52) U.S. Cl.
USPC .......................................... 370/235; 370/230

(58) Field of Classification Search
USPC .......... 370/229, 230, 235, 236; 726/1, 2, 3, 4, 726/21
See application file for complete search history.

(56) References Cited

U.S. PATENT DOCUMENTS

| 7,245,614 | B1 * | 7/2007 | Podar et al. | 370/389 |
| 7,725,925 | B2 * | 5/2010 | Liu et al. | 726/3 |
| 7,830,825 | B2 * | 11/2010 | Fu et al. | 370/312 |
| 8,121,124 | B2 * | 2/2012 | Baykal et al. | 370/390 |
| 8,203,943 | B2 * | 6/2012 | Dec | 370/230 |
| 2010/0046410 | A1 * | 2/2010 | So et al. | 370/312 |

OTHER PUBLICATIONS

"Access Node Control Protocol (ancp)", Nov. 15, 2010, vol. 3.12, Publisher: Downloaded from: https://datatracker.ietf.org/wg/ancp/charter.

Alcatel-Lucent, "Assuring Quality of Experience for IPTV—The Role of Video Admission Control", Apr. 28, 2009, pp. 1-15, Publisher: Alcatel-Lucent, Published in: Paris, France.

Begen et al., "A Unified Approach for Repairing Packet Loss and Accelerating Channel Changes in Multicast IPTV", "Consumer Communications and Networking Conference, 2009. CCNC 2009. 6th IEEE.", Feb. 18, 2009, pp. 1-6, Publisher: Cisco Systems, Published in: San Jose, CA, USA.

Bernstein, "VLAN Design for IPTV Networks", May 2006, pp. 1-12, Publisher: Juniper Networks, Inc., Published in: Sunnyvale, CA, USA.

Dessange et al., "Video Solutions for Service Providers", "Cisco Expo 2008", Apr. 22, 2008, Publisher: Cisco Systems, Inc.

Islam et al., "A Policy Framework for Multicast Group Control", Jan. 11, 2007, pp. 1103-1107, Publisher: Concordia University, Published in: Montreal, Quebec, Canada.

Juniper Networks, "Multicast Call Admission Control", Nov. 2007, pp. 3-7, Publisher: Juniper Networks, Inc., Published in: Sunnyvale, CA, USA.

(Continued)

*Primary Examiner* — Chi Pham
*Assistant Examiner* — Weibin Huang
(74) *Attorney, Agent, or Firm* — Fogg & Powers LLC

(57) ABSTRACT

Systems and methods for multicast admission control are provided. In one embodiment, a node comprises: a first interface configured to receive a multicast channel access request, from a subscriber interface, including an address for a channel; a memory including a subscriber profile and VLAN configuration data for the network; a processor that identifies a first VLAN corresponding to the address from the VLAN configuration data and determines whether the subscriber is authorized to receive the channel via the first VLAN based on access policy designated by the subscriber profile; wherein the processor further determines whether granting access to the channel violates admission control policy based on predefined bandwidth requirements and/or a stream count limit for the first VLAN; wherein when the subscriber interface is authorized to receive the channel and when granting access to the channel does not violate admission control policy, the processor routes the channel to the subscriber.

20 Claims, 4 Drawing Sheets

(56) References Cited

OTHER PUBLICATIONS

Juniper Networks, "Using Multicast Call Admission Control for IPTV Bandwidth Management", Mar. 2010, pp. 1-11, Publisher: Juniper Networks, inc., Published in: Sunnyvale, CA, USA.

Juniper Networks, "VLAN Design for IPTV/Multiplay Networks", Sep. 2010, pp. 1-8, Publisher: Juniper Networks, Inc., Published in: Sunnyvale, CA, USA.

* cited by examiner

SYSTEMS AND METHODS FOR MULTICAST ADMISSION CONTROL

BACKGROUND

Media content distribution networks, such a cable television networks, provide multiple services to subscribers such as Internet, video content and video on demand. Operators of these networks need to make sure that there is enough capacity available for each of these services, that the delivery of these services do not overwhelm or impact each other, and that the quality of service is preserved for each service. Typically, it is necessary to accurately account for how much capacity is needed to deliver each service and compare that capacity with designated subscriber limits to make sure no subscriber is able to place a demand on the network that exceeds what they are entitled to. The process of regulating subscriber demands on the network is referred to as admission control.

One challenge associated with admission control for video services comes from the fact that different content will have different capacity requirements. For example, given an available content channel lineup that includes High Definition (HD) content, Standard Definition (SD) content, and audio content (e.g. a radio channel), the HD quality video will consume a network capacity of 6 to 8 MB/sec, SD video will consume 2.2 to 2.7 MB/sec, and a radio stream will typically consume 64 to 128 kB/sec. In addition, overhead and management channels can occupy multiple low capacity multicast streams. These overhead channels are low capacity, but there are often several of them. To manage content for a subscriber entitled to 20 MB of video service (for example), and enforce the 20 MB limitation, the network must account for the capacity of the services being used by the subscriber.

For the reasons stated above and for other reasons stated below which will become apparent to those skilled in the art upon reading and understanding the specification, there is a need in the art for improved systems and methods for multicast admission control.

SUMMARY

The Embodiments of the present invention provide methods and systems for multicast admission control and will be understood by reading and studying the following specification.

In one embodiment, a node for managing admission control of multicast content on a content distribution network comprises: a first interface configured to receive a multicast channel access request from at least one subscriber interface, the multicast channel access request including a multicast address for a channel stream; a memory including a subscriber profile for a subscriber associated with the at least one subscriber interface and VLAN configuration data for the content distribution network; a processor coupled to the first interface and the memory; wherein the processor identifies a first VLAN corresponding to the multicast address from the VLAN configuration data and determines whether the at least one subscriber interface is authorized to receive the channel stream via the first VLAN based on an access policy designated by the subscriber profile; wherein the processor further determines whether granting access to the channel stream violates an admission control policy based on one or both of a predefined bandwidth requirement for the first VLAN and a stream count limit for the first VLAN; wherein when the at least one subscriber interface is authorized to receive the channel stream via the first VLAN and when granting access to the channel stream does not violate the admission control policy, the processor routes the channel stream to the at least one subscriber interface.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Figure 1A:
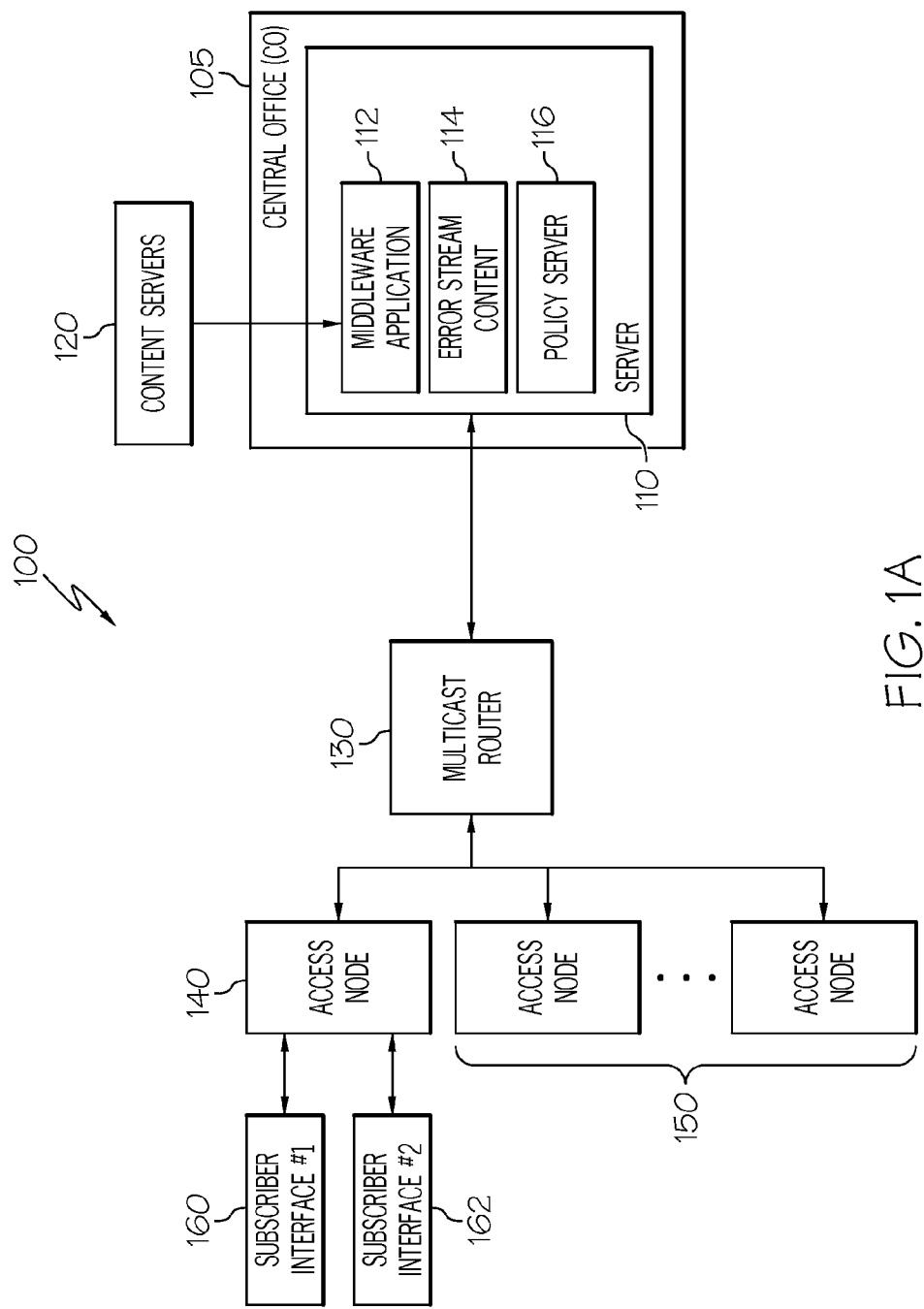
FIGS. 1A and 1B are block diagrams illustrating a multicast media delivery network of one embodiment of the present invention.

FIG. 1A is a block diagram illustrating a multicast media delivery network 100 of one embodiment of the present invention. Network 100 comprises a middleware application 112 executing on a server 110 located at an operator's central office (CO) 105. Middleware application 112 is linked to one or more content sources 120 (via a satellite link, for example). Network 100 further comprises a plurality of access nodes (shown at 140 and 150) coupled to server 110 via at least one multicast router 130. Although only access node 140 is described herein in detail, it is understood that access nodes 150 will operate under the same principle of operation as described herein for access node 140.

Access node 140 is the immediate network device for providing subscribers with access to content delivered by media delivery network 100. That is, access node 140 is coupled via a single hop connection to the subscriber's equipment, illustrated as subscriber interfaces 160 and 162. Subscriber interfaces 160 and 162 comprise devices such as, but not limited to, a set top box, a television installed cable television card, a personal computer, or other media presentation device. Subscriber interfaces 160 and 162 function to provide a viewer with channel lineup information, the ability to request a viewer specified channel, and deliver requested content provided by access node 140 to the viewer. Embodiments of the present invention provide systems and methods of admission control for regulating the content from media delivery network 100 that is available via subscriber interfaces 160 and 162.

As would be appreciated by one of ordinary skill in the art upon studying this specification, the greater the distance between subscriber interfaces 160 and 162 and the network device that performs admission control for network 100, the greater the delay that is introduced when accepting or rejecting a subscriber's content requests. Accordingly, making admission control decisions at the access node 140 will provide quicker responses to subscriber requests than if admission control decisions were performed by middleware application 112. At the same time, the operators of network 100 do not want to distribute too much responsibility down to the access node 140, which would tend to increase the complexity and costs associated with designing, fabricating, and operating access nodes. For example, the upstream middleware application 112 typically handles requests for over 100,000 subscribers whereas the access node 140 handles a single subscriber. If a function that could be performed by middleware application 112 is pushed down to the access node 140 level, that function would then have to be implemented at 100,000 different locations (for this example). Further, the network operator has less control over ensuring the availability of resources such a power at access node 140 installation locations than at central office 105. As such, when functions are pushed down to the access node 140 level, such functions need to be implemented as simply as possible, optimizing the processing capabilities and power resources available at that level.

Figure 1B:
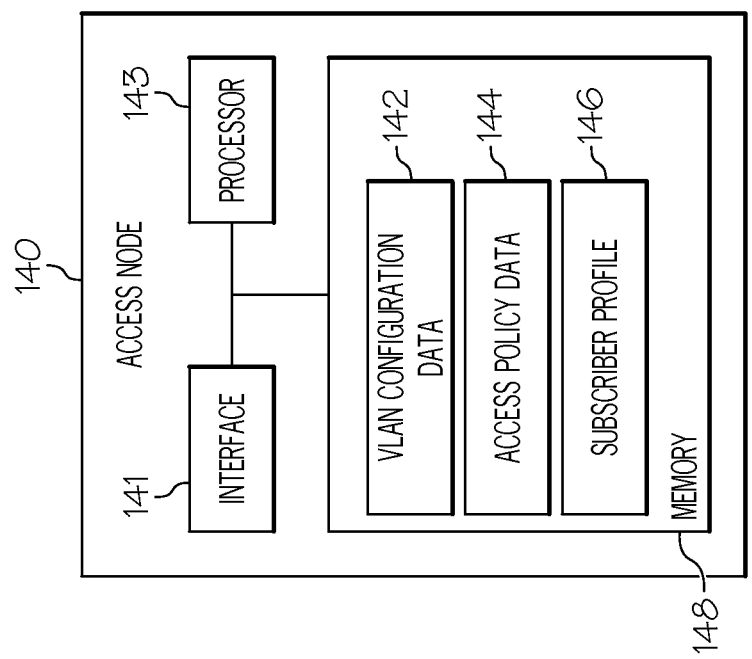

To address these considerations, embodiments of the present invention employ a scheme which places primary responsibility for admissions control at the access node 140, but simplifies the information and decision making structure necessary at access node 140. More specifically, embodiments of the present invention utilize virtual local area network (VLAN) designations to simplify the designation of media content types and specify network capacity requirements associated with each media content type, and utilize policies that regulate subscriber access as a function of the VLAN designation. As illustrated in FIG. 1B, access node 140 further includes an interface 141 for communicating with subscriber interfaces 160 and 162, and a processor 143 coupled to a memory 148 that comprises VLAN Configuration Data 142, Access Policy Data 144 and a Subscriber Profile 146, each of which are described in greater detail herein.

Table 1, shown below, provides an example of the contents of VLAN Configuration Data 142 for one embodiment of the present invention.

TABLE 1

| MVLAN | Content Service | Bandwidth | Multicast Address Range | Service |
|---|---|---|---|---|
| VLAN 10 | HD | 8 Mbits | 239.100.100.1-239.100.100.200 | IPTV |
| VLAN 20 | SD | 3 Mbits | 240.100.88.1-240.100.88.200 | IPTV |
| VLAN 30 | Audio | 64 Kbits | 239.100.66.1-239.100.99.200 | Radio |
| VLAN 40 | Management | N/A | 240.1.100.1-240.1.100.200 | IPTV |
| VLAN 50 | Data | 6 Mbits | 239.5.100.1-239.5.100.200 | Data |

As shown in Table 1, High Definition IPTV content is available in VLAN 10 from addresses within multicast address range 239.100.100.1-239.100.100.200, Standard Definition IPTV content is available in VLAN 20 from addresses within multicast address range 240.100.88.1-240.100.88.200, Audio only content, such as internet radio channels, is available in VLAN 30 from addresses within multicast address range 239.100.66.1-239.100.99.200, and so on. Note that it is not necessary for VLAN Configuration Data 142 to specify any information for specific channels. When a viewer at subscriber interface 160 requests access to address 239.100.100.50 (as an example), VLAN Configuration Data 142 tells access node 140 that the requested address falls in the multicast address range assigned to VLAN 10, and to account for 8 MB of capacity usage against the subscriber's maximum entitlement (if one exists). The access node does not need to know anything more specific about the particular content being requested for the purpose of keeping track of capacity demand. As such, the network operator can alter its channel lineup within a VLAN without the need to push capacity information about each channel in that lineup to access node 140. Instead, the network operator only needs to ensure that channels are correctly placed into the multicast address range for the appropriate VLANs for their content type.

Once a VLAN associated with a subscriber's request is determined, information provided by access policy data 144 and subscriber profile 146 is utilized by access node 140 to determine if access will be granted to the requesting subscriber.

Table 2 provides an example of a set of subscriber profiles (such as provided by access policy data 144 and/or subscriber profile 146) for one embodiment of the present invention.

TABLE 2

| Policy | Service Level | Direction | Upstream Bandwidth | Downstream Bandwidth | Classifier |
|---|---|---|---|---|---|
| P1 | IPTV-Gold | Down | N/A | 30 Mbit | C1 |
| P2 | IPTV-Silver | Down | N/A | 10 Mbit | C2 |
| P3 | IPTV-Video + Video on Demand | Bi-directional | 2 Mbit | 20 Mbit | C3 |

Each subscriber profile identifies a policy (designated, for example, as P1, P2, P3 . . . ) that defines a service level that a subscriber is entitled to receive and may be associated with programming packages marketed to subscribers by the network operator. Each policy defines whether an authorized service requires only downstream capacity or, alternately, bidirectional capacity, and defines the subscriber's maximum bandwidth entitlement under that policy for both upstream and downstream capacity. For example, a subscriber having a programming package governed by policy P1 is limited to a maximum downstream capacity usage of 30 MB. Another subscriber having a programming package governed by policy P2 is limited to a maximum downstream capacity usage of 10 MB. A classifier definition is associated with each Policy is also shown in Table 2. As illustrated in Table 3, the classifier definition can provide information such as, but not limited to, the subscriber drop packet format and the network transport packet format for the level of service, which content sources (i.e., multicast VLANS) can be accessed by the level of service, and optionally a filter to limit the subscriber to a only a subset of the content available on the Multicast VLANs.

TABLE 3

| Classifier | Network transport packet format | Subscriber drop packet format | Multicast VLAN Source | Filter |
|---|---|---|---|---|
| C1 | N/A | Untagged | 10, 20, 30, 40 | Filter 1 |
| C2 | N/A | VLAN = 10 | 50 | Filter 2 |

TABLE 3-continued

| Classifier | Network transport packet format | Subscriber drop packet format | Multicast VLAN Source | Filter |
|---|---|---|---|---|
| C3 | VLAN = 100, Pbit = 3 | VLAN = 20 | 10, 40 | Filter 3 |

Table 4 provides another example of possible admission control policies provided by access policy data 144. In Table 4, admission control policies are defined in terms of stream count limits and total bandwidth capacity limits. When the operator is defining the stream count limits they can utilize logical operators (OR and AND) as part of the rules—as an example the subscriber can be entitled to 2 HD OR 2 SD streams or 2 HD AND 2 SD streams. When stream count and bandwidth constraints are both used the access node verifies a content request against both policies before the content request is granted.

TABLE 4

| Policy | Stream Count Limits | Total Bandwidth Capacity Limit |
|---|---|---|
| P1 | 10-1 AND 20-3 AND 40-5 | 15 Mbit |
| P2 | 10-2 OR 30-2 AND 40-5 | N/A |
| P3 | 10-2 OR 30-2 AND 50-1 AND 40-5 | 16 Mbit |

For the embodiment shown in FIG. 1, the access policy data 144 is pushed out to access node 140 (and each of access nodes 150) on network 100 by a central policy server 116. As shown in FIG. 1, Central policy server 116 is implemented by server 110 at central office 105. In other embodiments, central policy server 116 is implemented by a separate server which may be located anywhere on network 100. Thus when a policy is changed, or policies are added or deleted, the network operator need only provide the update to the policy server 116. The policy server 116 will then provide access policy data updates to the appropriate access nodes 140, 150. In alternate embodiments, the access policy data 144 resident on access node 140 can be configured directly by the network operator on a node-by-node basis.

Figure 2:
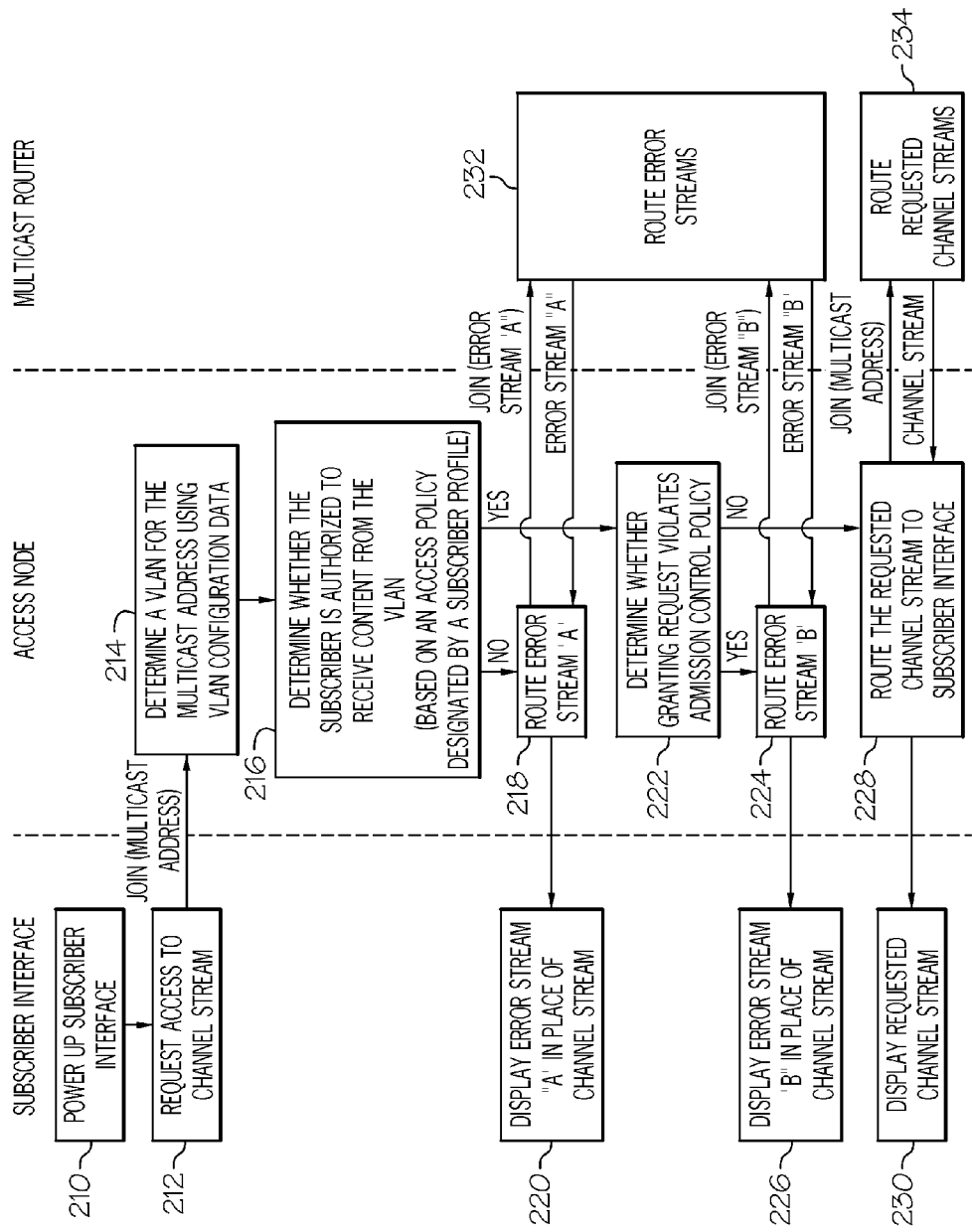
FIG. 2 is a diagram illustrating one embodiment of the present invention.

FIG. 2 is a sequence diagram depicting FIG. 1 in operation for one embodiment of the present invention. In particular, FIG. 2 illustrates a sequence where a subscriber interface places a request to an access node to receive media content.

The sequence begins at 210 where a subscriber powers up subscriber interface 160. For the purposes of this example, it can be assumed that subscriber interface 160 is a set-to-box. Middleware application 112 has previously delivered to subscriber interface 160 a channel line-up listing that provides the subscriber with a listing of channels and maintains a multicast address for each channel. Next, at 212, the subscriber interface 160 requests access to a channel stream. Because the subscriber interface has just been powered up, it will requests access to the last previously viewed channel ("The Discovery Channel HD" for example). In one embodiment, subscriber interface 160 requests content from access node 140 using the Join command of the Internet Group Management Protocol (IGMP) protocol. The IGMP protocol operates primarily using three primitives: the join request, the leave request, and the general query. For the join request, the subscriber interface 160 provides the multicast address for the requested channel stream to access node 140.

At 214, the access node determines which VLAN includes the multicast address of the requested channel, using the VLAN configuration data. This also serves to confirm that the requested content is in fact available via the content distribution network. Proceeding to 216, access node 140 determines whether the subscriber is authorized to receive content from the identified VLAN, based on the access policy designated by the subscriber's profile. In one embodiment, details of the access policy are stored in access policy data 144. That is, the subscriber profile 146 specifies under which policy the subscriber is authorized to receive content, and access policy data 144 specifies the permitted VLANs the subscriber can access and any access limits for that policy.

For example, assume that subscriber profile 146 indicates that the subscriber is authorized under policy P1 and the join request from subscriber interface 160 is for address 239.100.100.50. Access node 140 looks up the address in Multicast VLAN configuration data 142 and determines that the request is within VLAN 10. Since VLAN 10 is an authorized content source under policy P1, the subscriber is authorized to access content from that multicast stream.

When the subscriber is not authorized to receive the requested content, access node 140 routes an error stream (shown at 218 as "error stream 'A'") back to the subscriber interface instead of the requested content. In one embodiment, when this occurs, instead of propagating a request upstream for the requested content, access node 140 instead sends a join request to the upstream multicast router (shown at 232) for the desired error stream. Error stream "A" may provide a detailed error message explaining that the requested channel is not available under the user's subscription, or alternatively may simply indicate that access to the content is denied. The subscriber interface would then display that error stream content (shown at 220) rather than the requested content.

When the subscriber is not authorized to receive the requested content, the sequence proceeds to 222 where access node 140 determines whether granting the request violates the admission control policy. That is, even when the subscriber is authorized to access the requested content, access node 140 will decline access if granting access will violate the admission control policy. For this example, policy P1 indicates that the subscriber is authorized to receive a single VLAN 10 (HD) channels and up to three VLAN 20 (SD) channels, not to exceed a downstream bandwidth limit of 15 MB/sec (See, Table 4). Since the subscriber is currently receiving no other multicast streams, the join request for a first VLAN 10 channel will not violate the admission control policy's stream count limit. Further, the bandwidth allocation of 8 Mbits for a first VLAN 10 channel will not violate the admission control policy's bandwidth capacity limit of 15 MB/sec.

Thus, when the request does not violate admission control policy, the sequence proceeds to 228 where access node 140 routes the requested channel stream for the requested address to subscriber interface 160. If access node 140 is not already receiving the requested content, the access node will propagate the join request up to the multicast router (shown at 234) and configure a link to the subscriber interface 160 so that the subscriber will display the content (shown at 230) as soon as access node 140 starts receiving the content. If the access node is already receiving content from the requested multicast stream, then propagating the join request up the multicast router is unnecessary.

To continue this example, next assume that a viewer using subscriber interface 162 sends a join request to access node 140 for another HD channel at multicast address 239.100.100.90. As before, access node 140 will proceed to 214 and 216 to confirm that the requested content is available and determine the VLAN for the requested content. Since 239.100.100.90 is within the address range for VLAN 10, the subscriber is authorized to access the content of that HD channel. As before, the access node will proceed to 222 to determine if granting the subscriber to access the content will violate the admission control policy. This time, because the subscriber is already receiving a VLAN 10 multicast stream via subscriber interface 160, the join request from subscriber interface 162 will violate the admission control policy's VLAN stream count limit of one VLAN 10 channel.

Accordingly, when the request will violate the admission control policy, the sequence proceeds to 224 where access node 140 will route error steam "B" to subscriber interface 162. Error stream "B" may provide a detailed message explaining the subscriber has exceeded their subscription limits, or a simple message such as "access denied."

For both blocks 218 and 224, instead of providing content from the requested address, access node 140 is configured to deliver a multicast stream that contains a simple error message. In one embodiment, access node 140 requests an error stream from server 110 which provides error stream content (such as shown at 114). The error streams may be requested via standard IGMP protocol "join" messages as mentioned above. Access node 140 then delivers the error stream to the subscriber interface as if it was the requested content. In one embodiment, access node 140 modifies the address within error streams so that it appears to the subscriber interface as if an error stream was being delivered from the requested multicast address. In one embodiment, the error stream will deliver a simple text message against a static background (such as a blue background, for example) notifying the user at the second set-top-box that the requested channel is not available and the reasons why. The error stream could further provide the user with a phone number or internet address with instructions on how to increase their subscription level to increase their subscription limits. Because the content of the error stream is not complex, the network capacity consumed to deliver the error stream is not significant.

If instead of requesting another HD channel, the user at subscriber unit 162 requested an SD channel at multicast address 240.100.88.25, access node 140 will proceed to 214 and 216 to correlate the requested multicast address against Multicast VLAN configuration data 142. Since 239.100.88.25 is within the address range for VLAN 20, then under policy P1 the subscriber is authorized to access the content of that SD channel. As before, the access node will again proceed to 222 to determine if granting access the content at this time will violate the admission control policy. In this case, although the subscriber is currently already receiving a VLAN 10 multicast stream at subscriber interface 160, the join request for a VLAN 20 channel will not violate the admission control policy's VLAN stream count limit because the subscriber under policy P1 is entitle to access up to three VLAN 20 channels in addition to the one VLAN 10 channel. Further, the request for the SD channel will not violate the admission control policy's bandwidth capacity limit because the aggregate capacity demand of 11 MB/sec (one VLAN 10 stream at 8 MB/sec plus one VLAN 20 stream at 3 MB/sec) does not exceed the P1's capacity limit of 15 MB/sec.

Because this request does not violate the admission control policy, the sequence proceeds to 228 with access node 140 routing the requested channel stream from the requested address to the requesting subscriber interface. If access node 140 is not already receiving the requested content, it will propagate the join request up to the multicast router (as shown at 234) and configure a link to subscriber interface 162 so that the user will receive the requested SD content as soon as the access node 140 starts receiving the content.

As illustrated by the examples above, for admission control purposes, an access node does not require specific modulation or bandwidth details for a channel stream requested by a subscriber. It simply needs to know which VLAN the multicast address for that stream falls within. If the network operator shuffles its channel lineup, no modification at the access node is necessary for admission control purposes because admission control decisions are made based on VLAN designations. Authorization to access requested content can be verified by confirming that the policy designated by the subscriber's profile includes the VLAN for the multicast address of the requested content. Stream limits are enforced by simply keeping track of how many different streams are being delivered to a subscriber from each VLAN. Bandwidth capacity limits are enforced by keeping an aggregate total of the capacity requirements for each VLAN based on how many different streams are being delivered from each VLAN. Similarly, if a particular content provider alters the CODEC used to encode a multicast stream they provide, modification at the access node is not necessary for admission control purposes as long as the multicast stream remains in an appropriate VLAN for its content type (HD/SD/Audio, etc.) and maximum capacity requirements. Further because the network device that performs admission control is the access node (which is only one network hop from the subscriber interface) the amount of delay introduced when accepting or rejecting a subscriber's content requests is less than if the admission decisions were made further up the network, such as at the multicast router or middleware application.

Figure 3:
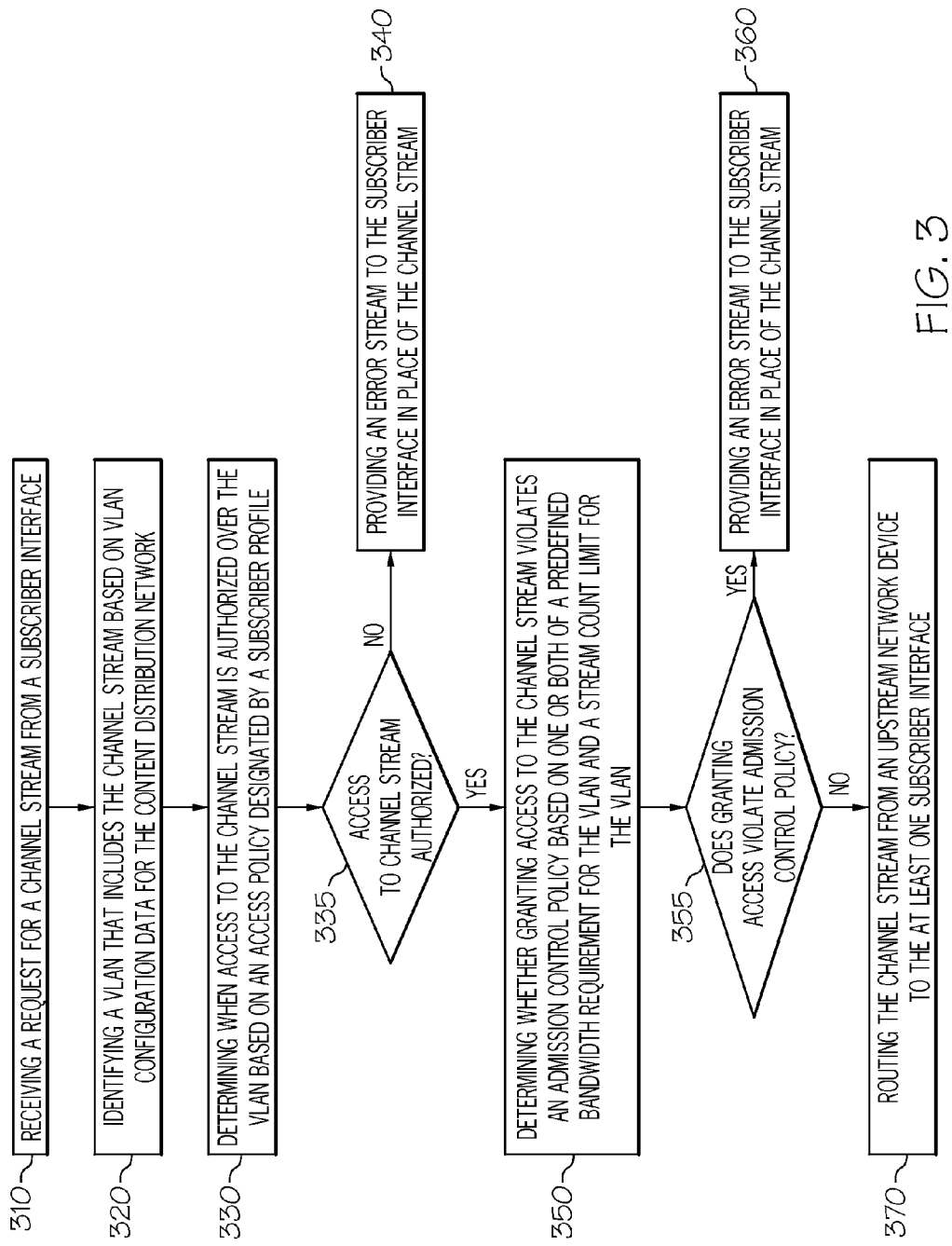
FIG. 3 is a flow chart illustrating a method of one embodiment of the present invention.

FIG. 3 is a flow chart illustrating a method of one embodiment of the present invention performed at a node of a media content distribution network. In one embodiment, said node of the media content distribution network is an access node coupled to one or more subscriber interfaces. In other embodiments, said node of the media content distribution network is a node other than an access node. In one embodiment, the method of FIG. 3 is performed using the network structure describe with respect to FIGS. 1 and 2. In other embodiments, other network structures are used. In one embodiment, the method of FIG. 3 is embodied by computer executable instructions stored on a computer readable medium device. In another embodiment, the method is embodied by a processor at the node executing instruction code that implements the method.

The method begins as 310 with receiving a request for a channel stream from a subscriber interface. In one embodiment, the request includes a network address which provides the channel stream. The method proceeds to 320 with identifying a VLAN that includes the channel stream based on VLAN configuration data for the content distribution network. In one embodiment, the node identifies which VLAN includes the channel stream by accessing a table of VLAN configuration data. The method proceeds to 330 with determining when access to the channel stream is authorized over the VLAN based on an access policy designated by a subscriber profile. In one embodiment, determining if access to the channel stream is authorized comprises accessing a table of access policy data to determine if the access policy permits access to the VLAN that includes the requested channel stream.

When access to the VLAN is not authorized (checked at 335), the method proceeds to 340 with providing an error stream to the subscriber in place of the channel stream. In one embodiment, if the node is not already receiving the error stream, it will propagate a join request up to the multicast router and configure a link to the subscriber interface so that the user will receive the error stream in place of the requested content as soon as the node starts receiving the error stream. In one embodiment, the node replaces the network address in the error stream with the network address for the requested channel stream so that it appears to the subscriber interface as if it is receiving the content it requested.

When access is authorized (checked at 335), the method proceeds to 350 with determining whether granting access to the channel stream violates an admission control policy based on one or both of a predefined bandwidth requirement for the VLAN and a stream count limit for the VLAN.

In one embodiment, granting access to the channel stream violates the admission control policy when granting access will cause a stream-count to exceed a stream count limit for the VLAN. That is, the admission control policy is violated when granting access to the channel stream would cause a stream count of channel streams received via the VLAN to exceed the stream count limit. In one embodiment, the stream count limit for the VLAN is defined by the admission control policy. Alternatively, the admission control policy may be violated when adding the predefined bandwidth requirement for the first VLAN to a current aggregate bandwidth usage would exceed a total bandwidth capacity limit defined by the admission control policy. The current aggregate bandwidth can be determined, for example, by multiplying the stream-count for each VLAN being delivered to the subscriber by the predetermined bandwidth capacity requirement associated with each respective VLAN.

In one embodiment, when granting access to the channel stream violates the admission control policy (checked at 355), the method proceeds to 360 with providing an error stream to the subscriber in place of the channel stream. This error stream is provided to the subscriber in the same way as the error stream described above for block 340. In alternate embodiments, the error stream provided at 360 may be the same error stream that would be provided at block 340, or may be a different error stream.

When access to the channel stream does not violate the admission control policy (checked at 355) the method proceeds to 370 with routing the channel stream from an upstream network device to the at least one subscriber interface. If the node is not already receiving the requested content, it will propagate the join request up to the multicast router and configure a link to the subscriber interface so that the user will receive the requested content as soon as the node starts receiving the channel stream.

Several means are available to implement the systems and methods discussed in this specification. These means include, but are not limited to, digital computer systems, embedded processors, microprocessors, general purpose computers, programmable controllers and field programmable gate arrays (FPGAs) or application-specific integrated circuits (ASICs). Therefore one or more embodiments of the present invention are program instructions resident on computer readable media which when implemented by such means enable them to implement embodiments of the present invention. Computer readable media for the memory and storage devices describe above include any form of a physical computer memory storage device. Examples of such a physical computer memory device include, but is not limited to, punch cards, firmware, magnetic disks or tapes, optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A node for managing admission control of multicast content on a content distribution network, the node comprising:
   a first interface configured to receive a multicast channel access request from at least one subscriber interface, the multicast channel access request including a multicast address for a channel stream;
   a memory including a subscriber profile for a subscriber associated with the at least one subscriber interface and Virtual Local Area Network (VLAN) configuration data for the content distribution network;
   a processor coupled to the first interface and the memory;
   wherein the processor identifies a first VLAN corresponding to the multicast address from the VLAN configuration data and determines whether the at least one subscriber interface is authorized to receive the channel stream via the first VLAN based on an access policy designated by the subscriber profile;
   wherein the processor further determines whether granting access to the channel stream violates an admission control policy based on one or both of a predefined bandwidth requirement for the first VLAN and a stream count limit for the first VLAN;
   wherein when the at least one subscriber interface is authorized to receive the channel stream via the first VLAN and when granting access to the channel stream does not violate the admission control policy, the processor routes the channel stream to the at least one subscriber interface.

2. The node of claim 1, wherein the node comprises an access node coupled by a single hop connection to the at least one subscriber interface via the first interface.

3. The node of claim 1, wherein the VLAN configuration data segregates multicast addresses for channel streams providing a first content type into the first VLAN, multicast addresses for channel streams providing a second content type into a second VLAN, and multicast addresses for channel streams providing a third content type content into a third VLAN.

4. The node of claim 3, wherein the VLAN configuration data segregates multicast addresses for one or more channel streams providing a high definition content into the first VLAN, and multicast addresses for one or more channel streams providing a standard definition content into the second VLAN.

5. The node of claim 1, wherein the at least one subscriber interface is not authorized to receive the channel stream via the first VLAN when the access policy does not designate the first VLAN as an authorized VLAN.

6. The node of claim 1, wherein the access policy further comprises a filter that limits access to only a subset of content available via the first VLAN.

7. The node of claim 1, wherein the at least one subscriber interface is authorized to receive the channel stream via the first VLAN when the access policy designates the first VLAN as an authorized VLAN.

8. The node of claim 1, wherein the admission control policy is violated when adding the predefined bandwidth requirement for the first VLAN to a current aggregate bandwidth usage would exceed a total bandwidth capacity limit defined by the admission control policy.

9. The node of claim 1 wherein the admission control policy is violated when granting access to the channel stream would cause a stream count of channel streams received via the first VLAN to exceed the stream count limit for the first VLAN, wherein the stream count limit for the first VLAN is defined by the admission control policy.

10. The node of claim 1, wherein when either the at least one subscriber interface is not authorized to receive the channel stream, or granting access to the channel stream would violate the admission control policy, the processor routes an error stream to the at least one subscriber interface in place of the channel stream.

11. A method for managing admission control of multicast content on a content distribution network, the method comprising:
   receiving a request for a channel stream from a subscriber interface;
   identifying a Virtual Local Area Network (VLAN) that includes the channel stream based on VLAN configuration data for the content distribution network;
   determining when access to the channel stream is authorized over the VLAN based on an access policy designated by a subscriber profile;
   determining whether granting access to the channel stream violates an admission control policy based on one or both of a predefined bandwidth requirement for the VLAN and a stream count limit for the VLAN;
   when access to the channel stream is authorized over the VLAN and when granting access to the channel stream does not violate the admission control policy, routing the channel stream from an upstream network device to the at least one subscriber interface; and
   when either access to the channel stream is authorized over the VLAN is not authorized, or granting access to the channel stream violates the admission control policy, routing an error stream to the at least one subscriber interface in place of the channel stream.

12. The method of claim 11, where receiving a request for the channel stream from a subscriber interface further comprises receiving a IGMP protocol Join request that includes a network address for the channel stream.

13. The method of claim 11, wherein identifying a VLAN that includes the channel stream based on VLAN configuration data for the content distribution network comprises:
   accessing a table of access policy data to determine if a policy permits access to the VLAN.

14. he method of claim 11, wherein the admission control policy is violated when adding the predefined bandwidth requirement for the VLAN to a current aggregate bandwidth usage would exceed a total bandwidth capacity limit defined by the admission control policy.

15. The method of claim 11, wherein the admission control policy is violated when granting access to the channel stream would cause a stream count of channel streams received via the VLAN to exceed the stream count limit for the VLAN, wherein the stream count limit for the VLAN is defined by the admission control policy.

16. The method of claim 11, wherein the method is performed at an access node coupled by a single hop connection to the subscriber interface.

17. The method of claim 11, wherein the VLAN configuration data segregates multicast addresses for channel streams providing a first content type into the first VLAN, multicast addresses for channel streams providing a second content type into a second VLAN, and multicast addresses for channel streams providing a third content type content into a third VLAN.

18. The method of claim 11, wherein the access policy further comprises a filter that limits access to only a subset of content available via the VLAN.

19. A node for managing admission control of multicast content on a content distribution network, the node comprising:
   a first interface configured to receive a multicast channel access request from at least one subscriber interface, the multicast channel access request including a multicast address for a channel stream;
   a memory including a subscriber profile for a subscriber associated with the at least one subscriber interface and Virtual Local Area Network (VLAN) configuration data for the content distribution network;
   a processor coupled to the first interface and the memory, the processor configured to execute computer executable instructions for a method for managing admission control, the method comprising:
      receiving the multicast channel access request from the first interface;
      identifying a VLAN that includes the multicast address based on the VLAN configuration data;
      determining when access to the channel stream is authorized over the VLAN based on an access policy designated by the subscriber profile;
      determining whether granting access to the channel stream violates an admission control policy based on one or both of a predefined bandwidth requirement for the VLAN and a stream count limit for the VLAN;
      when access to the channel stream is authorized over the VLAN and when granting access to the channel stream does not violate the admission control policy, routing the channel stream from an upstream network device to the at least one subscriber interface; and
      when either access to the channel stream is authorized over the VLAN is not authorized, or granting access to the channel stream violates the admission control policy, routing an error stream to the at least one subscriber interface in place of the channel stream.

20. The node of claim 19, wherein the admission control policy is violated when adding the predefined bandwidth requirement for the VLAN to a current aggregate bandwidth usage would exceed a total bandwidth capacity limit defined by the admission control policy; and
   wherein the admission control policy is violated when granting access to the channel stream would cause a stream count of channel streams received via the VLAN to exceed the stream count limit for the VLAN, wherein the stream count limit for the VLAN is defined by the admission control policy.

* * * * *